Feb. 20, 1923.

C. H. HATHAWAY ET AL

CLAMP

Filed Nov. 26, 1920

Inventor
Charles H. Hathaway
William A. Starck
By Edwin B. H. Tower Atty.

Feb. 20, 1923.
1,445,944
C. H. HATHAWAY ET AL
CLAMP
Filed Nov. 26, 1920
2 sheets-sheet 2
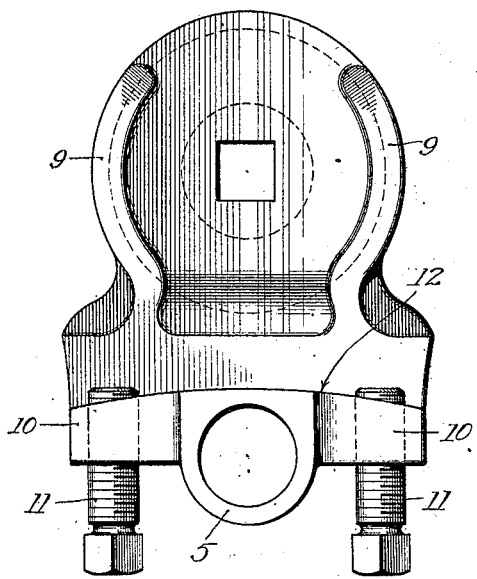
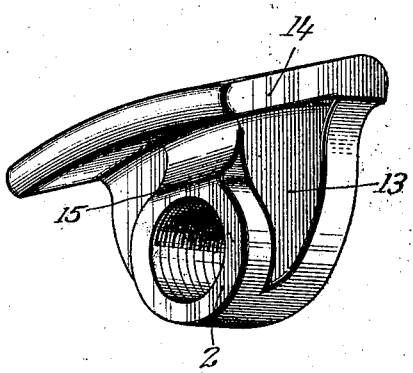
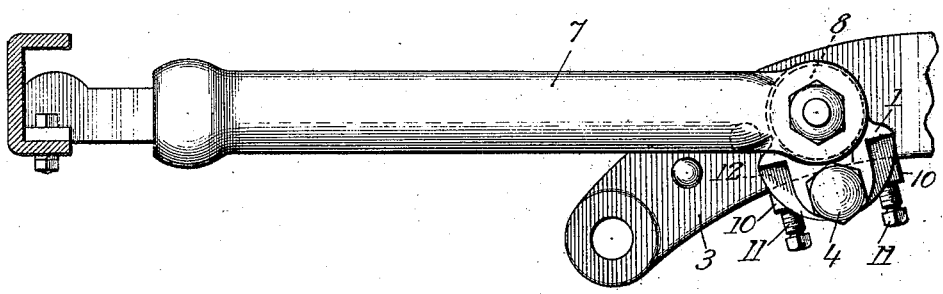
Inventor
Charles H. Hathaway
William A. Starck Patented Feb. 20, 1923.

1,445,944

UNITED STATES PATENT OFFICE.

CHARLES H. HATHAWAY, OF WEST ALLIS, AND WILLIAM A. STARCK, OF MILWAUKEE, WISCONSIN, ASSIGNORS TO BADGER MANUFACTURING CORPORATION, OF MILWAUKEE, WISCONSIN, A CORPORATION OF DELAWARE.

CLAMP.

Application filed November 26, 1920. Serial No. 426,599.

*To all whom it may concern:*

Be it known that we, CHARLES H. HATHAWAY and WILLIAM A. STARCK, citizens of the United States, residing, respectively, at West Allis, in the county of Milwaukee and State of Wisconsin, and Milwaukee, in the county of Milwaukee and State of Wisconsin, have invented new and useful Improvements in Clamps, of which the following is a specification.

This invention relates to clamps or attachers.

It is particularly adapted to fasten an automobile bumper bracket to the side bar of an automobile frame, but may be employed for other purposes.

The side bar ordinarily has a web with an upper and a lower inwardly projecting lateral flange. The automobile fenders ordinarily are fastened to the upper flanges of the side bars and project upwardly and outwardly therefrom. The splash apron extending between the side bars on some automobiles frequently are fastened to the upper flanges and clear the lower by narrow margins.

It has been proposed to fasten the bumper bracket to the side bar by means of attachers which extend through either the splash apron or the fender.

These attachers fail to serve satisfactorily the purpose particularly because they are difficult to fasten to the side bars and further because of the necessity of mutilating either the splash apron or the fender.

It, therefore, is desirable that the attacher be fastened near the end of the side bar and arranged to engage and be supported by the lower flange thereof.

According to this invention the attacher has a pair of clamping members or jaws held in clamping relation to the side bar by a holding member about which one of the clamping members supporting the bumper bracket may be moved in either direction to adjust the same with respect to the side bar. The lower flange of the side bar is also gripped longitudinally thereof by the attacher so that the bumper bracket is firmly attached to the side bar.

One of the objects of the invention therefore is to provide an attacher which may be readily applied to the side bar of an automobile frame and which grips the same both transversely and longitudinally thereof.

Another object is to provide an attacher wherein one of a pair of clamping members which supports the bumper bracket may be adjusted independently of the member holding the clamping members in clamping relation to the side bar.

Another object is to provide an attacher wherein one of a pair of clamping members may be adjusted in either direction about the holding member therefor as a pivot.

Other objects and advantages will hereinafter appear.

The views of the drawings are:

Fig. 3 is a rear elevation of the outer clamping member.

Fig. 4 is a perspective of the inner clamping member.

Fig. 5 is a side elevation of a bumper bracket fastened to the side bar by the attacher.

Figure 1:
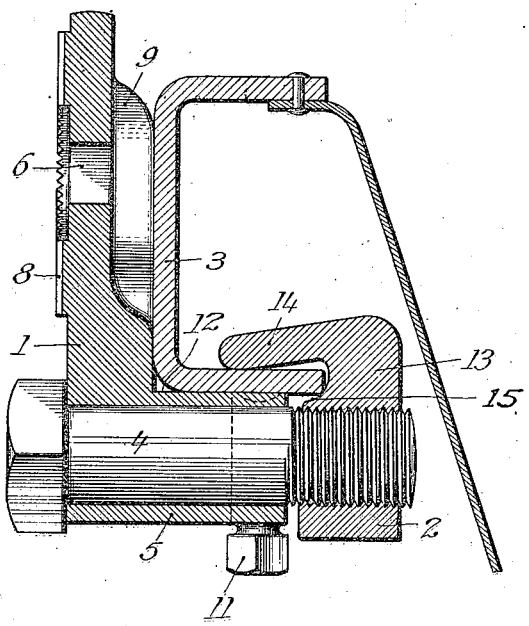
Fig. 1 is a vertical section through the clamp fastened to the side bar of an automobile frame.
Figure 2:
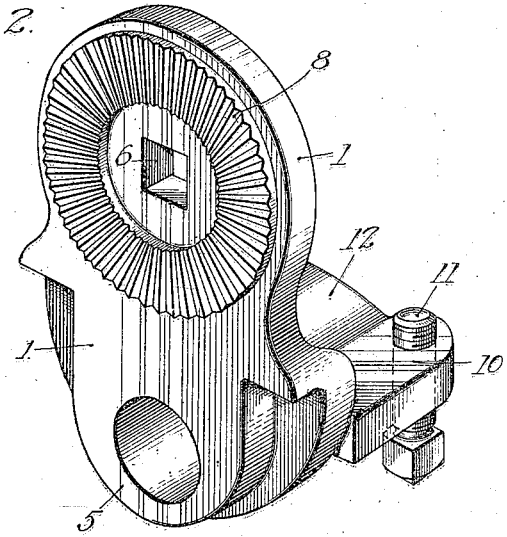
Fig. 2 is a perspective of the outer clamping member.

The attacher or clamp comprises an attacher clamping member 1 and inner clamping member 2 which may be held in clamping engagement with the lower flange of the side bar 3 of an automobile frame by means of a holding member 4. This holding member may take the form of a bolt whose shank extends through sleeve 5 carried by the outer clamping member 1 and having threaded engagement with the inner clamping member 2.

The outer clamping member 1 may take the form of a bracket having aperture 6, preferably square, to receive the shoulder of a carriage bolt by which a bumper bracket 7 may be fastened to the bracket or outer clamping member 1.

This bracket has an outer serrated or corrugated face 8 arranged to cooperate with a similar face provided at the rear end of the bumper bracket 7. Thus the bumper bracket 7 may be adjusted to different positions on the bracket 1 and held in such adjusted position through the cooperation of the engaged serrated faces and the holding bolt passing through the aperture 6.

The rear face of the outer clamping member or bracket 1 has flanges 9 which provide a space for accommodating the head of the carriage bolt by which the bumper bracket 7 is fastened thereto and also for providing a pocket for receiving the heads of rivets which may extend through the web of the side bar. Thus the outer clamping member or bracket 1 may be positioned flush with the web of a side bar.

The sleeve 5 is integral with the bracket 1 and has laterally extending wings 10 through which are threaded adjusting screws 11. These adjusting screws positioned one on either side of the bolt 4 serve to adjust the angular position of the bracket 1 with respect to the side bar 3 as will more fully hereinafter appear.

The upper face 12 of the sleeve 5 and its laterally extending wings 10 is curved to approximate the curvature of the downwardly extending ends of the side bar 3. Thus the angular position of the bracket 1 and its integral sleeve 5 may be adjusted readily with respect to the side bar.

The inner clamping member 2 may take the form of a nut for receiving the threaded bolt 4 by which the inner and outer clamping members are held together in clamping relation against the side bar.

The clamping nut 2 has at one end an outwardly and upwardly extending flange 13 from which extends a lateral projection 14 which overlies the inner or free end of the nut.

This projection 14 tilts or slopes downwardly from the flange 13 and is arranged to overlie the lower flange of the side bar 3 with the edge of this lower flange resting against the flange 13 of the nut or inner clamping member 2. Thus when the inner and outer clamping members are positioned on the side bar, as shown in Figure 1, the tightening of the bolt 4 causes the clamping members to clamp or grip the side bar transversely thereto.

The upper side 15 of the inner end of the nut 2 is arranged to fit under the lower flange of the side bar 3 and is so shaped with respect to the face of the flange 13 that there is a wedging action between the lower flange of the side bar 3 and the flange 13 and projection 14 when the bolt 4 is tightened.

The projection 14 is curved lengthwise to agree with the curvature of the upper face 12 of the sleeve 5 whereby the same may fit the downwardly extending ends of the side bars of automobile frames.

When fastening an automobile bumper bracket to the side bar of an automobile frame the inner clamping member 2 is positioned on the lower flange thereof with the projection 14 resting on the lower flange. The outer clamping member 1 is then positioned with the aperture of its sleeve registering with the threaded aperture of the inner clamping member 2. The bolt 4 may then be inserted through the sleeve 5 and tightened, drawing the clamping members up against the side bar 3 (as shown in Fig. 1). The attacher now grips the side bar with the projection 14 of the inner clamping member resting upon the lower flange of the side bar and supporting the parts of the attacher.

In order that the outer clamping member 1 may be so adjusted that the aperture 6 thereof and the integral sleeve 5 thereof may be brought into vertical alinement, one or both of the screws 11 may be adjusted to move the outer clamping member 1 in one direction or the other about the bolt 4 as a pivot. When the proper vertical adjustment has been attained the screws 11 may be tightened against the under face of the lower side bar flange.

The ends of the adjusting screws 11 are cup-shaped so that they bite into the flange and hold. When the adjusting screws 11 are tightened against the lower side of the flange they cooperate with the projection 14 resting on the upper face of the lower side bar flange and grip this flange longitudinally thereof.

The described attacher provides means for attaching a bumper bracket to the side bar of an automobile frame in such a manner that the position of the bumper bracket on the supporting outer clamping member may be adjusted without loosening the holding bolt 4 or molesting the adjusting screws 11.

If desired, the position of the bumper bracket 7 with respect to the side bar may be adjusted by means of adjusting screws 11 without interfering with the connection between the bumper bracket 7 and the outer clamping member 1.

The embodiment illustrated in the drawings and described in the specification is for the purpose of illustration only and is, therefore, to be considered in an illustrative and not in a limited sense. It is obvious that many changes and adaptations will readily occur to and may be made by those skilled in the art without departing from the spirit and scope of the invention, as defined by the claims.

The invention claimed is:

1. An attacher for fastening an automobile bumper bracket to the side bar of an automobile frame comprising a pair of clamping members adapted to grip the bar therebetween and transversely thereto, a member for holding the clamping members in clamping relation to the side bar, one of the pair of clamping members being arranged to support the bumper bracket, and a pair of adjusting screws carried by one of the clamping members and arranged to move the bumper bracket supporting clamping member in either direction about the holding member as a pivot thereby to adjust the angular position of such supporting member with respect to the side bar, one of the clamping members extending longitudinally of the side bar and overlying the same and the adjusting screws.

2. A bumper support for connection to the side bar of an automobile frame comprising a clamp for gripping the bar laterally and transversely, the clamp including a bolt, a nut therefor having an angular projection overlying a flange of the side bar, a member movable in either direction about the bolt, and means for gripping the flange between the angular projection and the member, said gripping means including set screws positioned on opposite sides of the bolt and substantially directly under bearing points of the angular projection on the flange.

3. A bumper clamp for connection to the side bar of an automobile frame comprising a bolt, a nut therefore for overlying and engaging the side bar, a member rotatable on the bolt and cooperating with the nut to grip the side bar therebetween, and means for rotating said member in either direction to adjust the same, the rotating means cooperating with the nut to grip the side bar therebetween in another plane and including a pair of set screws, one being threaded in said member on each side of the bolt, said nut extending longitudinally so as to overlie both set screws.

In witness whereof, we have hereunto subscribed our names.

CHARLES H. HATHAWAY.
WILLIAM A. STARCK.